(12) United States Patent
Rovniaguin

(10) Patent No.: US 9,282,116 B1
(45) Date of Patent: Mar. 8, 2016

(54) SYSTEM AND METHOD FOR PREVENTING DOS ATTACKS UTILIZING INVALID TRANSACTION STATISTICS

(71) Applicant: F5 Networks Inc., Seattle, WA (US)

(72) Inventor: Dmitry Rovniaguin, Rishon le Zion (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/030,685

(22) Filed: Sep. 18, 2013

Related U.S. Application Data

(60) Provisional application No. 61/706,724, filed on Sep. 27, 2012.

(51) Int. Cl.
*H04L 29/00* (2006.01)
*H04L 29/06* (2006.01)

(52) U.S. Cl.
CPC ....... *H04L 63/1458* (2013.01); *H04L 2463/141* (2013.01); *H04L 2463/142* (2013.01)

(58) Field of Classification Search
CPC ..................... H04L 63/1458; H04L 2463/141; H04L 2463/142
USPC .......................................................... 726/25
See application file for complete search history.

(56) References Cited

U.S. PATENT DOCUMENTS

| | | | |
|---|---|---|---|
| 5,958,053 A * | 9/1999 | Denker | 726/1 |
| 6,119,234 A | 9/2000 | Aziz et al. | |
| 6,839,850 B1 | 1/2005 | Campbell et al. | |
| 7,028,182 B1 | 4/2006 | Killcommons | |
| 7,299,491 B2 | 11/2007 | Shelest et al. | |
| 7,441,429 B1 * | 10/2008 | Nucci et al. | 70/229 |
| 7,620,733 B1 | 11/2009 | Tzakikario et al. | |
| 7,921,211 B2 | 4/2011 | Larson et al. | |
| 7,941,517 B2 | 5/2011 | Migault et al. | |
| 8,266,427 B2 | 9/2012 | Thubert et al. | |

(Continued)

FOREIGN PATENT DOCUMENTS

WO 2009052668 A1 10/2007

OTHER PUBLICATIONS

Bagnulo et al., "DNS 64: DNS extensions for Network Address Translation from IPv6 Clients to IPv4 Servers," Internet draft, Jul. 2010, pp. 1-31, IETF Trust.

(Continued)

*Primary Examiner* — Michael Pyzocha
(74) *Attorney, Agent, or Firm* — LeClairRyan, a Professional Corporation

(57) ABSTRACT

A method and network traffic management device to protect a network from network based attacks is disclosed. The method comprises receiving, at a network traffic management device, a plurality of requests from a plurality of client devices for one or more resources from one or more servers. The method comprises monitoring a number of server responses including an invalid transaction message for a particular client device or a particular requested resource. The method comprises comparing a ratio of invalid transactions to valid transactions for the particular client device or requested resource to a preestablished ratio threshold value. The method comprises marking the particular client device or requested resource as suspicious when the ratio exceeds the ratio threshold value. The method comprises preventing the suspicious particular client device or requested resource from being transmitted to the one or more servers when the network traffic management device detects a network attack.

6 Claims, 6 Drawing Sheets

(56) References Cited

U.S. PATENT DOCUMENTS

| | | | |
|---|---|---|---|
| 8,281,383 | B2 | 10/2012 | Levy-Abegnoli et al. |
| 8,289,968 | B1 | 10/2012 | Zhuang |
| 9,106,699 | B2 | 8/2015 | Thornewell et al. |
| 2002/0103916 | A1* | 8/2002 | Chen et al. ............... 709/229 |
| 2003/0074434 | A1* | 4/2003 | Jason et al. .............. 709/223 |
| 2003/0221000 | A1* | 11/2003 | Cherkasova et al. ......... 709/224 |
| 2005/0028010 | A1* | 2/2005 | Wallman ................ 713/201 |
| 2005/0125195 | A1* | 6/2005 | Brendel ................ 702/182 |
| 2006/0288413 | A1* | 12/2006 | Kubota ................. 726/23 |
| 2007/0214503 | A1* | 9/2007 | Shulman et al. ........... 726/22 |
| 2008/0137659 | A1 | 6/2008 | Levy-Abegnoli et al. |
| 2008/0205415 | A1 | 8/2008 | Morales |
| 2008/0271132 | A1 | 10/2008 | Jokela et al. |
| 2008/0304457 | A1 | 12/2008 | Thubert et al. |
| 2009/0187649 | A1 | 7/2009 | Migault et al. |
| 2009/0271865 | A1* | 10/2009 | Jiang ................. 726/23 |
| 2010/0034381 | A1 | 2/2010 | Trace et al. |
| 2010/0061380 | A1 | 3/2010 | Barach et al. |
| 2010/0077462 | A1 | 3/2010 | Joffe et al. |
| 2010/0142382 | A1* | 6/2010 | Jungck et al. ............. 370/242 |
| 2010/0161774 | A1 | 6/2010 | Huang et al. |
| 2010/0217890 | A1 | 8/2010 | Nice et al. |
| 2010/0228813 | A1 | 9/2010 | Suzuki et al. |
| 2010/0274885 | A1 | 10/2010 | Yoo et al. |
| 2010/0325264 | A1* | 12/2010 | Crowder et al. ............. 709/224 |
| 2011/0038377 | A1 | 2/2011 | Haddad |
| 2011/0055921 | A1* | 3/2011 | Narayanaswamy et al. .... 726/22 |
| 2011/0154132 | A1* | 6/2011 | Aybay ................ 714/49 |
| 2011/0211553 | A1 | 9/2011 | Haddad |
| 2011/0282997 | A1* | 11/2011 | Prince et al. ............. 709/226 |
| 2011/0283018 | A1 | 11/2011 | Levine et al. |
| 2011/0292857 | A1 | 12/2011 | Sarikaya et al. |
| 2011/0307629 | A1 | 12/2011 | Haddad |
| 2012/0005372 | A1 | 1/2012 | Sarikaya et al. |
| 2012/0047571 | A1 | 2/2012 | Duncan et al. |
| 2012/0054497 | A1 | 3/2012 | Korhonen |
| 2012/0059934 | A1 | 3/2012 | Rafiq et al. |
| 2012/0071131 | A1* | 3/2012 | Zisapel et al. ............. 455/410 |
| 2012/0110210 | A1 | 5/2012 | Huang et al. |
| 2012/0117379 | A1 | 5/2012 | Thornewell et al. |
| 2012/0174217 | A1* | 7/2012 | Ormazabal .............. 726/22 |
| 2012/0259998 | A1 | 10/2012 | Kaufman |
| 2012/0284296 | A1 | 11/2012 | Arifuddin et al. |
| 2013/0007870 | A1 | 1/2013 | Devarajan et al. |
| 2013/0100815 | A1 | 4/2013 | Kakadia et al. |
| 2013/0103805 | A1 | 4/2013 | Lyon |
| 2013/0151725 | A1 | 6/2013 | Baginski et al. |
| 2013/0166715 | A1 | 6/2013 | Yuan et al. |
| 2013/0201999 | A1 | 8/2013 | Savolainen et al. |
| 2013/0205035 | A1 | 8/2013 | Chen |
| 2013/0205040 | A1 | 8/2013 | Naor et al. |
| 2013/0335010 | A1* | 12/2013 | Wu et al. ............... 320/107 |
| 2013/0340079 | A1* | 12/2013 | Gottlieb et al. ............. 726/23 |

OTHER PUBLICATIONS

Bau et al., "A Security Evaluation of DNSSEC with NSEC3," Mar. 2, 2010; updated version corrects and supersedes a paper in the NDSS' 10 proceedings, pp. 1-18.

F5 Networks, Inc., "BIG-IP Global Traffic Manager and Big-IP Link Controller: Implementations," Manual 0304-00, Dec. 3, 2009, pp. 1-161, version 10.1, F5 Networks, Inc.

F5 Networks, Inc., "BIG-IP Systems: Getting Started Guide," Manual 0300-00, Feb. 4, 2010, pp. 1-102, version 10.1, F5 Networks, Inc.

F5 Networks, Inc., "Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

F5 Networks, Inc., "Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

F5 Networks, Inc., "DNS DDOS Protection Functional Spec," BigipDNSDDOSProtectionFS<TMO<TWiki, last accessed Mar. 31, 2010, pp. 1-2.

F5 Networks, Inc., "DNSSEC Functional Spec," TMOSDnsSECFS<TMOS<TWiki, last accessed on Mar. 31, 2010, pp. 1-10.

F5 Networks, Inc.,"DNS Security (DNSSEC) Solutions," <http://www.f5.com/solutions/security/dnssec>, printed Aug. 23, 2010, pp. 1-4.

Xelerance, "DNSX; DNSX Secure Signer; DNSSEC Management Solution," <http://www.xelerance.com/dnssec>.pp. 1-9, Aug. 2009.

F5 Networks, Inc., "F5 and Infoblox Provide Customers with Complete DNS Security Solution," <http://www.f5.com/news-press-events/press12010/20100301.html>, Mar. 1, 2010, 2 pages, F5 Networks, Inc., Seattle and Santa Clara, California.

F5 Networks, Inc., "F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.

Forrester Consulting, "DNSSEC Ready for Prime Time," White Paper, Jul. 2010, pp. 1-23, Forrester Research, Inc., Cambridge, Maine.

Higgins, Kelly Jackson, "Internet Infrastructure Reaches Long-Awaited Security Milestone," Dark Reading, Tech Center: Security Services, <http//www.darkreading.com/securityservices/security/management/showArticle.jhtml?article>, Jul. 28, 2010. pp. 1-4.

Howarth, Fran, "Investing in security versus facing the consequences," White Paper by Bloor Research, Sep. 2010, pp. 1-15.

Kaminsky, Dan, "Black Ops of Fundamental Defense: Introducing the Domain Key Infrastructure," <http://www.slideshare.net/RecursionVentures/dki-2>, Aug. 2010, slides 1-116.

Laurie et al., "DNS Security (DNSSEC) Hashed Authenticated Denial of Existence," Network Working Group, RFC 5155, Feb. 2008, pp. 1-51.

MacVittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 3-7.

F5 Networks, Inc., "PDR/CDR for RQ-GTM-0000028," BigipDNSDDOSProtectionPDR<TMOS<TWiki, last accessed on Mar. 31, 2010, pp. 1-14.

Silva, Peter, "DNSSEC: The Antidote to DNS Cache Poisoning and Other DNS Attacks," F5 Technical Brief, 2009, pp. 1-10.

Thomson et al., "DNS Extensions to Support IP Version 6," The Internet Society, Network Working Group, RFC 3596, Oct. 2003, pp. 1-8.

Wikipedia, "Domain Name System Security Extensions," <http://en.wikipedia.org/wiki/DNSSEC>, accessed Jun. 3, 2010, pp. 1-20.

Wikipedia, "IPv6", <http://en.wikipedia.org/wiki/IPv6>, accessed Jun. 3, 2010, 1 page.

Wikipedia, "List of DNS record types," <http://en.wikipedia.org/wiki/List_of_DNS_record_types>, Jun. 2010, pp. 1-6.

SECURE64, "Secure64 DNS Signer", <http://www.secure64.com>, Data sheet, Jun. 22, 2011, V.3.1., 2 pages.

"Who is Xelerance," <http://www.xelerance.com>, slides 1-6.

Arends R., et al., "DNS Security Introduction and Requirements", Network Working Group, RFC 4033, Mar. 2005, pp. 1-20.

Arends R., et al., "Protocol Modifications for the DNS Security Extensions", Network Working Group, RFC 4035, Mar. 2005, pp. 1-50.

Arends R., et al., "Resource Records for the DNS Security Extensions", Network Working Group, RFC 4034, Mar. 2005, pp. 1-28.

Aura T., "Cryptographically Generated Addresses (CGA)", Network Working Group, RFC 3972, Mar. 2005, pp. 1-21.

Carpenter, B., "Transmission of IPv6 over IPv4 Domains without Explicit Tunnels", Network Working Group, RFC 2529, Mar. 1999, pp. 1-10.

Eastlake D., "Domain Name System Security Extensions", Network Working Group, RFC 2535, Mar. 1999, pp. 1-44.

Tatipamula M., et al., "IPv6 Integration and Coexistence Strategies for Next-Generation Networks", IEEE Communications Magazine, Jan. 2004, pp. 88-96.

International Search Report and Written Opinion for PCT/US2011/054331, Mar. 13, 2012, 13 pages.

Weiler et al., "Minimally Covering NSEC Records and DNSSEC On-line Signing," Network Working Group, RFC 4470, Apr. 2006, 8 pages, The Internet Society.

* cited by examiner

SYSTEM AND METHOD FOR PREVENTING DOS ATTACKS UTILIZING INVALID TRANSACTION STATISTICS

STATEMENT OF RELATED APPLICATION

The present application claims the benefit of priority based on U.S. Provisional Patent Application Ser. No. 61/706,724, filed on Sep. 27, 2012, in the name of inventor Dmitry Rovniaguin, entitled "System and Method for Preventing DOS Attacks Utilizing Invalid Transaction Statistics", which is hereby incorporated by reference.

FIELD

The technology generally relates to network communication security, and more particularly, to a system and method for preventing DOS attacks utilizing invalid transaction statistics.

BACKGROUND

With the widespread use of Web based applications and the Internet in general, concerns have been raised with the availability of servers in view of malicious attacks from client devices requesting access to servers. Such attacks may include brute force attempts to access the server or so-called denial of service attacks. A denial-of-service attack (DoS attack) and distributed denial-of-service attack (DDoS attack) are attempts to make a computer server unavailable to its intended users. A denial of service attack is generally a concerted, malevolent effort to prevent an Internet site or service from functioning.

DoS and DDoS attacks typically target sites or services hosted on high-profile Web servers such as banks, credit card payment gateways and root servers. One common method of attack involves saturating the target machine with external communication connection requests such that it cannot respond to legitimate traffic, or responds so slowly as to be rendered effectively unavailable. In general terms, DoS attacks are implemented by forcing the targeted server computer to reset or consume its resources to the point of interrupting communications between the intended users and servers.

Denial of service attacks and brute force attacks depend on client devices mimicking legitimate requests to tie up server resources. In order to prevent such attacks, network firewalls may be used to intercept traffic to a networked server and attempt to filter out malicious packets. Unfortunately, many current firewalls typically cannot distinguish between legitimate requests that are originated by legitimate users and transactions that are originated by attackers.

There are many DDOS and DOS attacks type know which target servers, wherein each type of attack has different parameters which requires different methods of detection and prevention to be employed by network security devices to allow them to be effective. Existing network security devices are not able to distinguish valid client requests from attacks when executing a prevention technique, such as rate limiting for example.

SUMMARY

In an aspect, a method for a network traffic management device to protect a network from network based attacks is disclosed. The method comprises receiving, at a network traffic management device, a plurality of requests from a plurality of client devices for one or more resources from one or more servers. The method comprises monitoring a number of server responses including an invalid transaction message for a particular client device or a particular requested resource. The method comprises comparing a ratio of invalid transactions to valid transactions for the particular client device or requested resource to a preestablished ratio threshold value. The method comprises marking the particular client device or requested resource as suspicious when the ratio exceeds the ratio threshold value. The method comprises preventing the suspicious particular client device or requested resource from being transmitted to the one or more servers when the network traffic management device detects a network attack.

In an aspect, a computer-readable readable medium having stored thereon computer-executable instructions for a network traffic management device to protect a network from network based attacks is disclosed. The computer-executable instructions, when executed, cause the network traffic management device to receive a plurality of requests from a plurality of client devices for one or more resources from one or more servers. The network traffic management device will monitor a number of server responses including an invalid transaction message for a particular client device or a particular requested resource. The network traffic management device will compare a ratio of invalid transactions to valid transactions for the particular client device or requested resource to a preestablished ratio threshold value. The network traffic management device will mark the particular client device or requested resource as suspicious when the ratio exceeds the ratio threshold value. The network traffic management device will prevent the suspicious particular client device or requested resource from being transmitted to the one or more servers when the network traffic management device detects a network attack.

In an aspect, a network traffic management device comprises a network interface capable of receiving and transmitting network data packets over a network. The network traffic management device comprises a memory having stored thereon code embodying processor executable programmable instructions. The network traffic management device includes a processor configured to execute the stored programming instructions in the memory. The instructions cause the processor to receive a plurality of requests from a plurality of client devices for one or more resources from one or more servers. The instructions cause the processor to monitor a number of server responses including an invalid transaction message for a particular client device or a particular requested resource. The instructions cause the processor to compare a ratio of invalid transactions to valid transactions for the particular client device or requested resource to a preestablished ratio threshold value. The instructions cause the processor to mark the particular client device or requested resource as suspicious when the ratio exceeds the ratio threshold value. The instructions cause the processor to prevent the suspicious particular client device or requested resource from being transmitted to the one or more servers when the network traffic management device detects a network attack.

In one or more of the above aspects, the network traffic management device enters into prevention mode upon detecting the network attack.

In one or more of the above aspects, the network traffic management device is further configured to monitor current transactions per second for connections handled by the network traffic management device; and compare the current average transactions per second value over short set period of time with an average transactions per second value over a long set period of time, wherein the network traffic management device enters the prevention mode when the short average transactions per second value exceed a long average transactions per second value by preset ratio or short average transactions per second value exceed preset threshold value. In one or more aspects, the set period of time is approximately 1 minute or 1 hour.

In one or more of the above aspects, the network traffic management device is further configured to monitor current latency values for connections handled by the network traffic management device; and compare the current average latency values over a short set period of time with an average latency value over a long set period of time, wherein the network traffic management device enters the prevention mode when the short average latency value exceeds a long average latency by specified ratio or exceed preset threshold value. In one or more aspects, the set period of time is approximately 1 minute or 1 hour.

Figure 1:
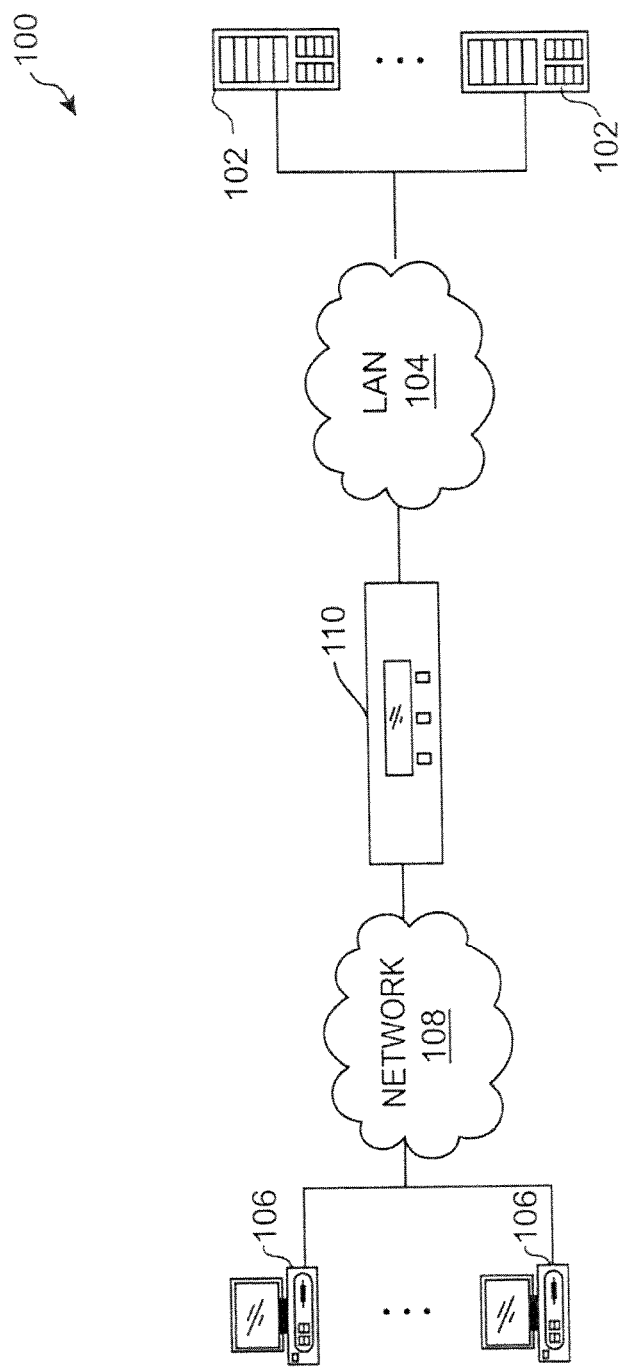
FIG. 1 is a diagram of an example system environment that includes a network traffic manager configured to identify and diffuse network attacks in accordance with an aspect of the present disclosure.

While these examples are susceptible in many different forms, there is shown in the drawings and will herein be described in detail several examples with the understanding that the present disclosure is to be considered as an exemplification and is not intended to limit the broad aspect to the embodiments illustrated.

DETAILED DESCRIPTION

FIG. 1 is a diagram of an example system environment that includes a network traffic management device configured to identify and diffuse network attacks in accordance with an aspect of the present disclosure. As shown in FIG. 1, an example system environment 100 employs one or more network traffic management devices 110 that is capable of identifying and thwarting or diffusing these types of network attacks in an effective manner. The example system environment 100 also includes one or more Web application servers 102, and one or more client devices 106, although the environment 100 could include other numbers and types of devices in other arrangements. The traffic management device 110 is coupled to the web application servers 102 via local area network (LAN) 104 and client devices 106 via network 108. Generally, requests sent over the network 108 from client devices 106 towards Web application servers 102 are received by network traffic management device 110. Similarly, responses sent from the servers 102 to the client devices 106 are received by the network traffic management device 110.

Client devices 106 comprise computing devices capable of connecting to other computing devices, such as network traffic management device 110 and Web application servers 102, over wired and/or wireless networks, such as network 108, to send and receive data, such as for Web-based requests, receiving responses to requests and/or for performing other tasks in accordance with the processes described below. Non-limiting and non-exhausting examples of such devices include personal computers (e.g., desktops, laptops), mobile and/or smart phones, tablets, smart TVs and media players and the like. In this example, client devices 106 run Web browsers that may provide an interface for operators, such as human users, to interact with for making requests for resources to different web server-based applications or Web pages served by servers 102 via the network 108. One or more Web-based applications may run on the web application server 102 that provide the requested data back to one or more exterior network devices, such as client devices 106.

Network 108 comprises a publicly accessible network, such as the Internet, although the network 108 may comprise other types of private and public networks that include other devices. Communications, such as requests from clients 106 and responses from servers 102, take place over the network 108 according to standard network protocols, such as the HTTP and TCP/IP protocols, although other protocols are contemplated. Further, it should be appreciated that network 108 may include local area networks (LANs), wide area networks (WANs), direct connections and any combination thereof, and other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108, and thus will not be described further.

Web application server 102 (referred to herein as "server") comprises one or more server computing machines capable of operating one or more Web-based applications that may be accessed by one or more client devices 106 via the network traffic management device 110. The server 102 may provide other data representing requested resources, including but not limited to Web page(s), image(s) of physical objects, and any other web or non-web objects. It should be noted that while only two Web application servers 102 are shown in the environment 100 depicted in FIG. 1, other numbers and types of servers may be coupled to the network traffic management device 110. It is also contemplated that one or more of the Web application servers 102 may be a cluster of servers managed by the network traffic management device 110. It should also be noted that the Web-based applications may be handled in an on-demand fashion, such as in a cloud computing architecture. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Generally, the network traffic management device 110 manages network communications, which may include one or more client requests and server responses, over the network 108 between the client devices 106 and the servers 102. For instance, the network traffic management device 110 may perform several network traffic related functions involving the communications, such as load balancing, access control, and validating HTTP requests. The network traffic management device 110 includes a security module (FIG. 2) which detects and prevents a DOS attack based on invalid transaction statistics as described further below.

Figure 2:
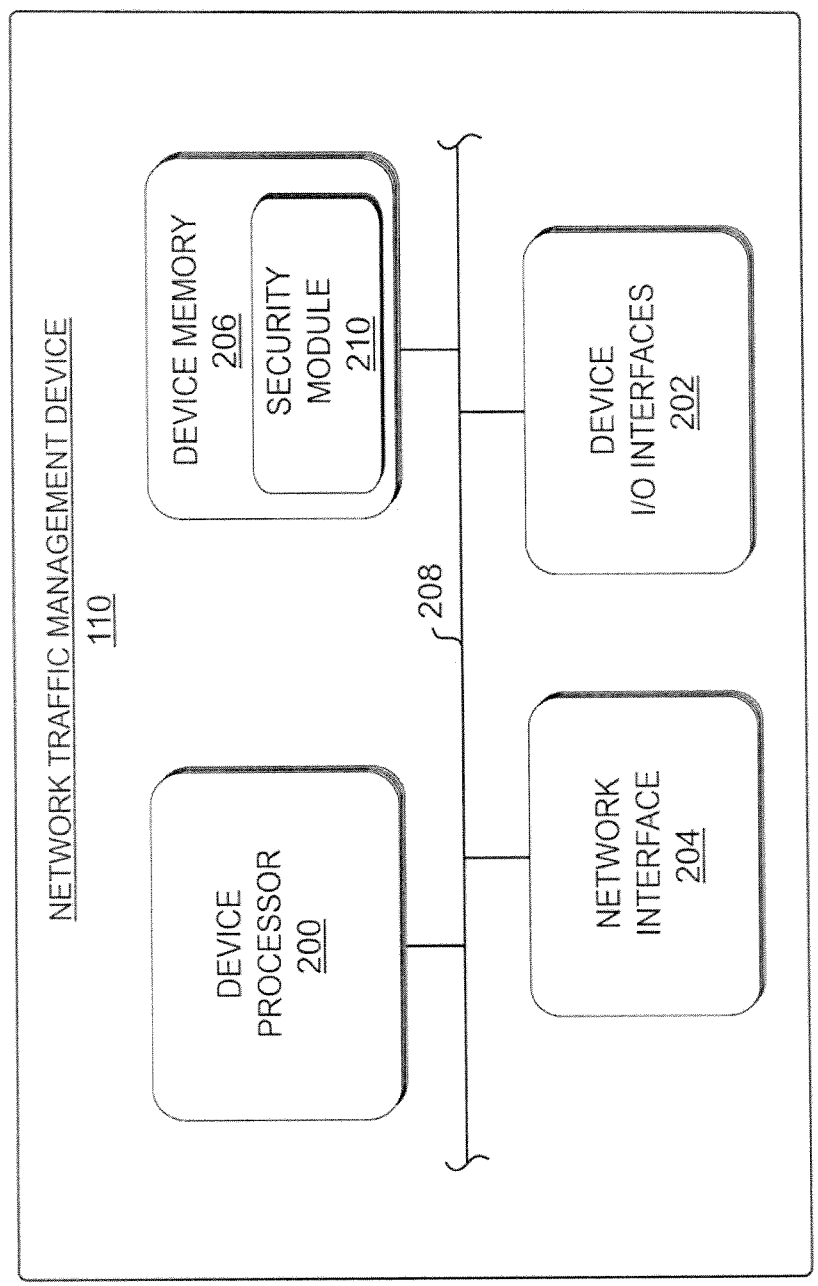
FIG. 2 is a block diagram of the network traffic manager shown in FIG. 1 in accordance with an aspect of the present disclosure.

Referring now to FIG. 2, an example network traffic management device 110 includes a device processor 200, device I/O interfaces 202, network interface 204 and device memory 206, which are coupled together by bus 208, although the device 110 could include other types and numbers of components.

Device processor 200 comprises one or more microprocessors configured to execute computer/machine readable and executable instructions stored in device memory 206 to implement the functions that the security module 210 performs, as discussed in FIGS. 3A-3D. The processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 202 comprise one or more user input and output device interface mechanisms, such as a computer keyboard, mouse, display device, and the corresponding physical ports and underlying supporting hardware and software to enable the network traffic management device 110 to communicate with the outside environment. Alternatively or in addition, as will be described in connection with network interface 204 below, the network traffic management device 110 may communicate with the outside environment for certain types of operations (e.g., configuration) via a network management port, for example.

Network interface 204 comprises one or more mechanisms that enable network traffic management device 110 to engage in TCP/IP communications over LAN 104 and network 108, although the network interface 204 may be constructed for use with other communication protocols and types of networks. Network interface 204 is sometimes referred to as a transceiver, transceiving device, or network interface card (NIC), which transmits and receives network data packets over a network connection. In an aspect where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as Web application servers 102. Moreover, the interface 204 may include certain physical ports dedicated to receiving and/or transmitting certain types of network data, such as device management related data for configuring the network traffic management device 110.

The bus 208 enables the various components of the network traffic management device 110, such as the processor 200, device I/O interfaces 202, network interface 204, device memory 206 and other hardware components, to communicate with one another. Bus 208 may comprise one or more internal device component communication buses, links, bridges and supporting components, such as bus controllers and/or arbiters. By way of example only, example buses include HyperTransport, PCI, PCI Express, InfiniBand, USB, Firewire, Serial ATA (SATA), SCSI, IDE and AGP buses and the like.

Device memory 206 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information, such as computer readable/machine-executable instructions, data structures, program modules, or other data. The computer readable media may be obtained and/or executed by one or more processors 200 to perform actions such as implementing an operating system for controlling the general operation of network traffic management device 110. Other actions include implementing security module 210 to perform one or more portions of the processes illustrated in FIGS. 3A-3D.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing or specially programmed device, such as network traffic management device 110. When the instructions stored in device memory 206 are run by the device processor 200, the network traffic management device 110 implements the functions handled by the security module 210 and performs at least a portion of the processes in FIGS. 3A-3D.

As shown in FIG. 2, the security module 210 is depicted as being within the memory 206. However, it should be appreciated the security module 210 may be alternatively located elsewhere within or exterior to the network traffic management device 110. Generally, when instructions embodying the security module 210 are executed by the processor 200, the network traffic management device 110 is able to perform the processes described in detail below.

In general, the security module 210 of the network traffic management device 110 is configured to detect and prevent disbursed DOS attacks from occurring against one or more servers 102. In particular, the security module 210 detects and prevents such DOS attacks using such criteria or parameters like Transactions per second (TPS) and/or network related latency values for client devices 106 and/or requested resources (e.g. web objects). In accordance with the present disclosure, the security module 210 monitors the number of invalid transactions which occur within a certain amount of time and compares that number (or ratio with valid transactions) with a threshold value. If threshold value is exceeded, the security module 210 marks the particular client device 106 and/or requested resource as being suspicious. In the event that a DOS attack is detected, the security module 210 will automatically deny all requests which are marked as being suspicious. It should be noted that the processes performed by the security module 210 of the network traffic management device 110 can be implemented in conjunction with existing detection and prevention techniques already employed by the network traffic management device 110.

The security module 210 may detect prevent network attacks, or at least suspected network attacks, by analyzing collected short average and/or long average TPS and Latency data regarding particular client devices 106, client requests destined for one or more particular servers 102, particular resources (e.g. requested web objects) and the like. In an aspect, the security module 210 will monitor, for each client device 106, history of access statistics based on one or more response codes returned by server 102.

In an aspect, the security module 210 monitors responses from servers 102 and, in particular, makes note of HTTP based server response codes in the server responses. In particular, the security module 210 will flag server response codes that indicate an invalid policy based transaction, such as 400 series response codes (e.g. 403, 404) or other series response codes which may indicate suspicious activity. Clients (IP) will have their 'miss' ratio Responses with 4XX response code to all Responses (or Requests) of that client. If 'miss' ratio passes a predefine threshold, the client device 106 and/or requested resource is marked or identified as being suspicious. In addition the security module 210 will keep tracking of server responses that return valid response codes.

The network traffic management device 110 of the present disclosure monitors average historical analytic data including, but not limited to, average data for TPS and latency values, over time. In an aspect, the security module 210 monitors short average historical data as well as long average historical data of TPS and latency values while it operates in the detection mode. For example, the security module 210 can monitor the average number of transactions which occur in a minute when monitoring the short average transaction data.

In another example, the security module 210 monitors short average latency data by monitoring the round trip time (RTT) or other time measurement data between the client device and server for a requested web object. The security module 210 accordingly uses additional information obtained by further analyzing collected data to identify latencies associated with particular servers, server applications or other server resources, page traversal rates, client device fingerprints and access statistics that the security module 210 may analyze to identify anomalies indicative to the module 210 that there may be an attack. The security module 210 also analyzes collected data to obtain information the security module 210 may use to identify particular servers and/or server applications and resources on particular servers, such as Web application server 102, being targeted in network attacks, so the module 210 can handle the attack in the manner described in greater detail below.

In an aspect, the security module 210 may utilize overall TPS and latency values in determining whether a network attack has occurred (such as when the length of time during which the network traffic management device 110 has been operational is relatively short).

In an aspect, the short average data of the TPS and latency values are defined as being taken over a relatively small amount of time, such as one to a plurality of minutes. In comparison, the long average data of the TPS and latency values are defined as being taken over a relatively longer amount of time, such as one to a plurality of hours. For example, the security module 210 can monitor the number of transactions which occur in an hour when monitoring the long average transaction data.

The security module 210 compares the average TPS value over a time duration with a predefined TPS threshold value to determine whether a particular client device 106 is to be deemed suspicious. For example, the security module 210 may compare the TPS average (short or long) of a particular client device 106 with the predefined threshold value, whereby the security module 210 will designate that client device 106 as suspicious if it determines that the client device 106 has a 'miss' ratio that exceeds the predefined threshold value. With regard to latency, the security module 210 compares the average latency value over a time duration with a predefined latency threshold value to determine whether a DOS attack has initiated.

If the security module 210 detects a DOS attack, based on TPS and/or web object latency values, the security module 210 will change its operating status from the detection mode to the prevention mode. The security module 210, once in prevention mode, will implement one or more appropriate prevention methods to prevent suspicious network activity from being sent from the network traffic management device 110 to the server 102.

When the security module 210 is in prevention mode, the security module 210 prevents requests from client devices 106 marked suspicious from being passed to the server 102 for a set amount of time. Additionally in prevention mode, module 210 will only pass requests to web objects that resulted in a valid transaction prior the prevention period, blocking all other requests assuming they target violated or non-accessible resources. Once the prevention mode time expires, the security module 210 may again initiate the prevention mode or return back to detection mode.

While in prevention mode, the security module 210 monitors the short historical average TPS and latency data to determine whether the DOS attack is continuing or whether it has ended. In an example, if the short average TPS data indicates that the number of transactions per second has dramatically decreased after the network traffic management device module 210 begun operating in the prevention mode and prevented suspicious client requests from passing onto the server 102, the security module 210 can conclude that the attack has ended. In this example, the security module 210 will no longer operate in prevention mode and will thus return to detection mode. In contrast, if the security module 210 determines from the short average data that the network attack has not been thwarted (or a new network attack has initiated), the security module 210 will remain in the prevention mode until it concludes that the attack has ended.

Such prevention methods include, but are not limited to, executing challenges based on client device IP and/or requested web objects, implementing rate limiting techniques to client device IP and/or web objects and the like. In an aspect, one technique that can be employed by the security module 210 upon detecting a suspected network attack involves initially preventing the client requests from reaching the server 102 to allow the security module 210 to determine whether the requests are indeed a network attack or is legitimate requests. In this aspect, the security module 210 sends a "modified" response back to the potential suspected client device 106 on behalf of the potential target, whereby the modified response does not embody the requested object or resource, but instead includes a challenge. In particular to this aspect, the challenge comprises information representing instructions (e.g., JavaScript code) to be executed by the suspected client device to execute the challenge, which may or may not yield an expected result. The client device's answer to the challenge may generate an HTTP cookie for storing any result(s) obtained from answering the challenge, whereby the HTTP cookie is included in the client's answer to the challenge. In an aspect, the challenge comprises Javascript code to be executed by the suspected client device, although other types of challenges could be employed and the code could be expressed in other programming, markup or script languages. If the potential attacker is indeed an actual attacker conducting an automated attack, then the attacker may not execute the challenge (e.g., JavaScript code) included in the modified response received back from the security module 210, or the attacker may execute the challenge but not generate the correct result, and the security module 210 determines it is a confirmed attack and will prevent the target of the attack (e.g., server 102) from being subjected to the request and expending its resources in responding to it. If the potential attacker is indeed a legitimate requestor and not mounting an attack, it will execute the challenge (e.g., JavaScript code) included in the modified request, which will cause it to resend its initial request and include any results obtained by executing the challenge in the HTTP cookie. In an aspect, the security module 210 has access to a list of allowable challenge answers stored in one or more memories 206. The security module 210, upon receiving the client's answer, analyzes the HTTP cookie and determines whether the answer in the cookie matches the list of allowable answers stored in memory. If the security module 210 confirms whether one or more of the included challenge answers are correct, it will determine that the suspected client device is indeed a legitimate requestor. The security module 210 then forwards the request on to the server 102.

In additional aspect, the security module 210, when in prevention mode, will prevent client requests from identified or marked suspicious client devices 106 from passing on to the server 102. In this aspect, the security module 210 will prevent such client requests from passing on to the server 102 for a predefined time duration. The time duration can be defined by a network administrator or other authority. In this aspect, if the security module 210 determines that the prevention was not effect and that the DOS attack is still present, ever after the time-limit has expired, the security module 210 will allow access only to those client devices 106 that respond with a valid response code that is present in a collected history of valid objects that is stored in the network traffic management device 110. For all other client requests that do not provide a valid response code, the security module 210 sends a blocking message back to the requesting client device 106.

In addition 'miss' criteria might be correlated with blocked requests by ASM enforcing policy, for example count valid transactions (request with response) and not valid transactions (blocked by policy or with 4XX response code).

Figure 3A:
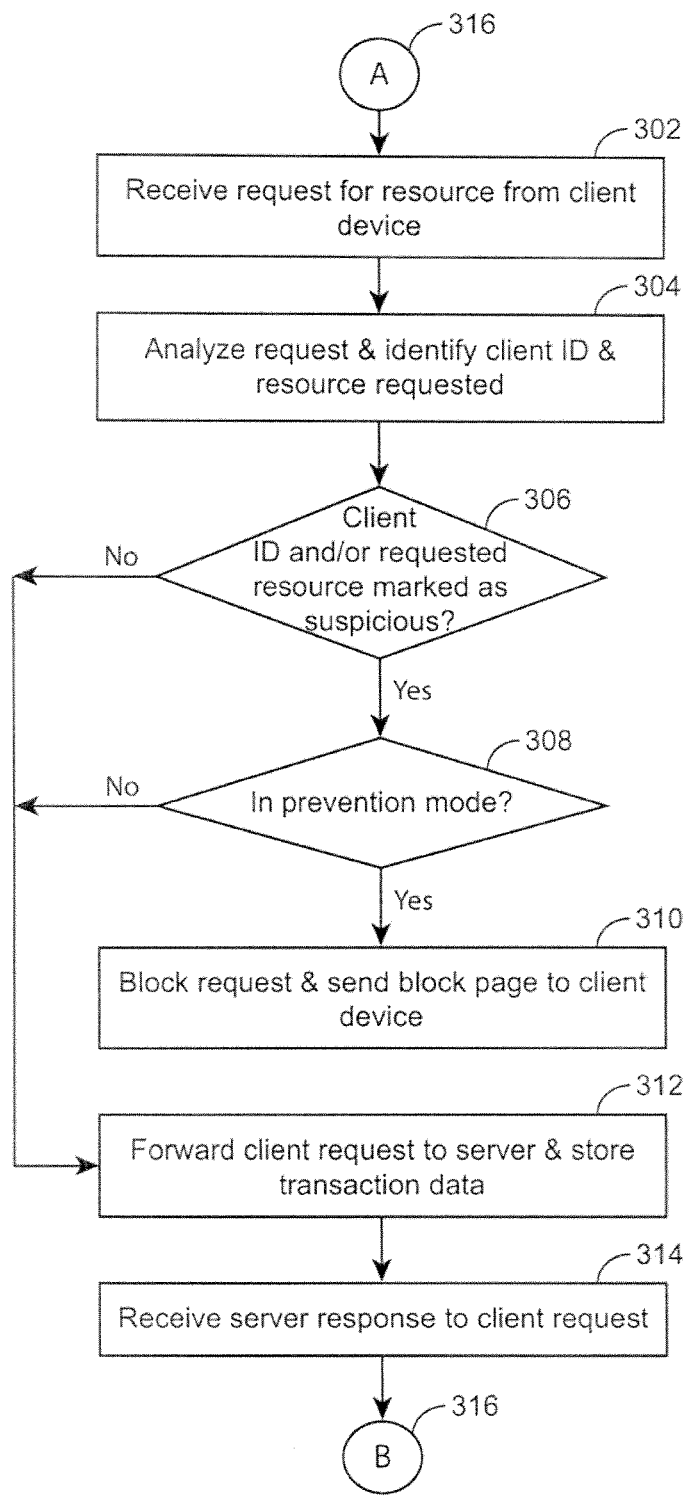
FIG. 3A is a flow diagram of a process implemented by the security module for handling client requests in accordance with an aspect of the present disclosure.

FIG. 3A is a flow diagram of a process implemented by the security module for handling client requests in accordance with an aspect of the present disclosure. As shown in FIG. 3A, the process 300 is described from a point when the network traffic management device 110 receives a request from a client device 106 to request a resource, such as a web object, from a server 102 (Block 302). It should be noted, for purposes of describing the processes only, that the network traffic management device 110 is at least operating in a detection mode at the commencement of the process 300 (for example, before or during the A block in FIG. 3A).

The security module 210 of the network traffic management device 110 analyzes the request and identifies the client device 106 by client ID or other identifying matter as well as the particular resource that is being requested from the server 102 (Block 304). The network traffic management device 110 then determines whether the analysis evidences that the client device 106 and/or requested resource has been marked or identified as suspicious (Block 306). In an aspect, the security module 210 accesses one or more databases which contain information of all client devices and resources which have been previously marked or blacklisted as being suspicious.

If the security module 210 determines that neither of the client device 106 nor requested resource is deemed as suspicious, the process continues to Block 312, wherein the security module 210 forwards the client request to the server 102 and stores the transaction data in memory 206 (Block 312). The security module 210 thereafter receives the server response from the server 102 (Block 314), wherein the process proceeds to Block B.

In contrast, if the security module 210 determines from the marked data base that either or both of the client device 106 and requested resource is deemed as suspicious, the process continues to Block 308. As shown in FIG. 3A, if the security module 210 is currently operating in the prevention mode, the security module 210 blocks the request from being sent to the server 102 and also sends a block page to the requesting client device 106 (Block 310). In contrast, if the security module 210 is not operating in the prevention mode, the process proceeds to Block 312, described above.

Figure 3B:
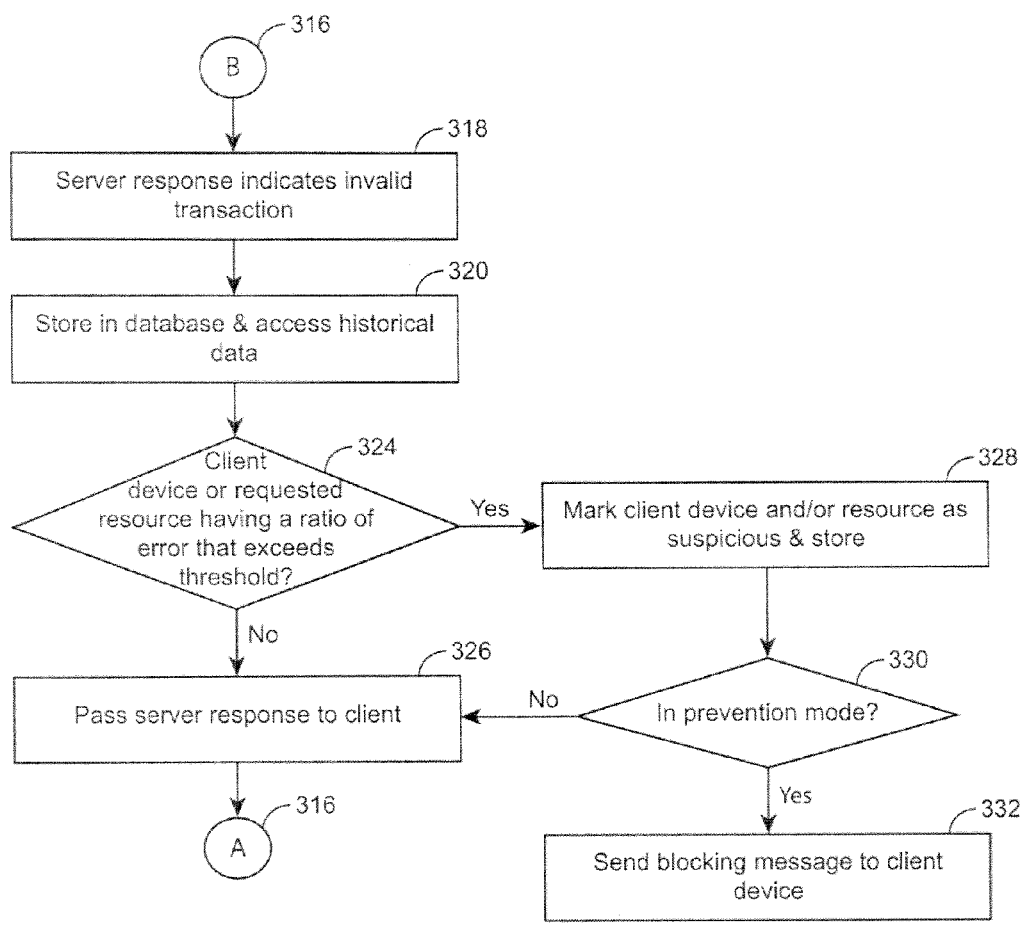
FIG. 3B is a flow diagram of a process implemented by the security module for handling server responses in accordance with an aspect of the present disclosure.

FIG. 3B is a flow diagram of a process implemented by the security module for handling server responses in accordance with an aspect of the present disclosure. As shown in FIG. 3B, the security module 210 analyzes the received response from the server 102, whereby the received response includes a response code indicating an invalid transaction (Block 318). The security module 210 stores this information for the client device 106 and requested resource in a memory 206 (Block 320).

The security module 210 thereafter determines a ratio of error for the client device as well as the requested resource and compares the ratio of error with a predefined threshold value (Block 324). If the security module 210 determines that the ratio of error has not exceeded the predefined threshold, the security module 210 passes the server response to the client device 106 (Block 326).

In contrast, if the security module 210 determines that the ratio of error has exceeded the predefined threshold, the security module 210 marks the client device 106 and/or requested resource as suspicious and stores that information in the memory 206 (Block 328).

As shown in FIG. 3B, if the security module 210 is in the prevention mode (Block 330), the security module 210 does not send the forward server response to the client device 106 as either/both of the client device 106 and requested resource is considered by the security module 210 as being suspicious. Instead, the security module 210 sends a blocking message to the client device 106 (Block 332).

Referring back to Block 330, if the security module 210 is not currently operating in the prevention mode, the security module 210 forwards the server response on to the requesting client device 106, even though the activity is marked as suspicious (Block 326).

Figure 3C:
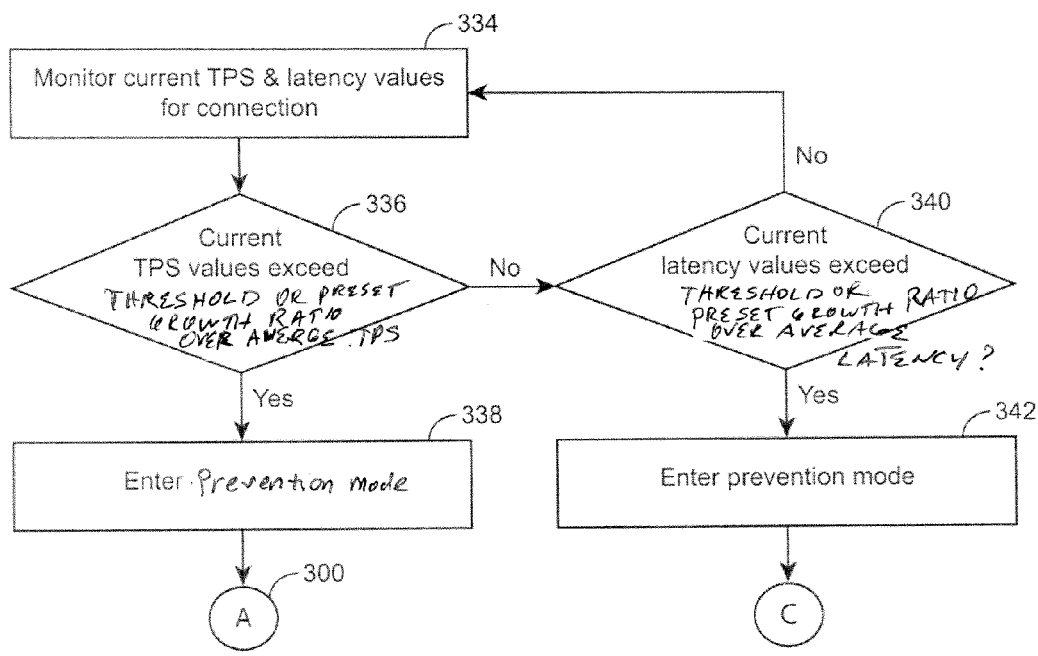
FIG. 3C is a flow diagram of a process implemented by the security module for determining whether to enter prevention mode in accordance with an aspect of the present disclosure.

FIG. 3C is a flow diagram of a process implemented by the security module for determining whether to enter prevention mode in accordance with an aspect of the present disclosure. As shown in FIG. 3C, the security module 210 stores and analyzes current TPS and latency data for the disbursed connections handled by the network traffic management device 110 (Block 334).

The security module 210 determines whether the current TPS values exceed the short and/or long TPS averages at any particular time (Block 336). If so, the security module 210 enters prevention mode (Block 338). If not, the security module 210 determines if the currently monitored latency values exceeds the short and/or long latency averages at any particular time (Block 340), in which the process proceeds to Block C. It should be noted that although steps 336 and 340 are shown in a certain order, the security module 210 can perform both of these steps simultaneously. However, if the security module 210 determines that the current latency values exceed the threshold average, the security module 210 enters prevention mode (Block 342). The process proceeds to Block C.

Figure 3D:
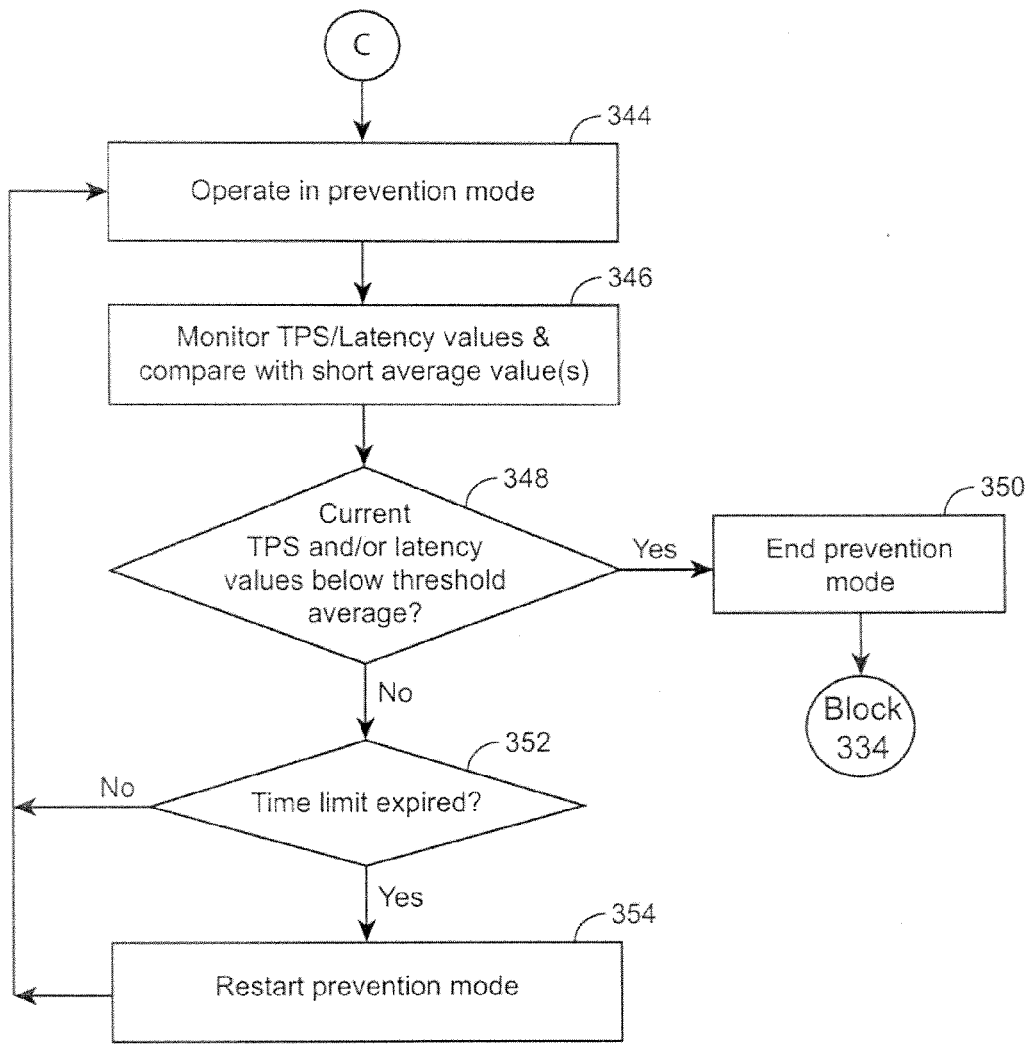
FIG. 3D is a flow diagram of a process implemented by the security module for determining whether to exit the prevention mode in accordance with an aspect of the present disclosure.

FIG. 3D is a flow diagram of a process implemented by the security module for determining whether to exit the prevention mode in accordance with an aspect of the present disclosure. As shown in FIG. 3D, the process continues from Block C in which the security module 210 remains in prevention mode and performs the prevention techniques described above (Block 344). The security module 210 monitors the current TPS and latency values and compares them with the corresponding TPS/latency short averages (Block 346).

As shown in FIG. 3D, if the security module 210 determines that either or both of the current TPS and latency values are below the threshold average (Block 348), the security module 210 terminates the prevention mode (Block 350).

In contrast, if the security module 210 determines that either or both of the current TPS and latency values are not below the threshold average (Block 348), the security module 210 determines whether the predefined prevention time limit has expired (Block 352). If not, the security module 210 continues to remain in the prevention mode and the process proceeds back to Block 344. If the time limit has expired, the security module terminates the prevention mode and starts another prevention mode, wherein the timer for measuring the prevention mode duration is reset (Block 354).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for protecting a network from network based attacks, the method comprising:
   monitoring, by a network traffic management device, at least one of current transactions per second or current latency values for one or more established connections with one or more client devices and generating at least one of a current average transactions per second value or a current average latency value based on the monitoring;
   comparing, by the network traffic management device, at least one of the current average transactions per second value or the current average latency value to an average transactions per second value or an average latency value over at least one of a short set period of time or a long set period of time; and
   entering, by the network traffic management device, a prevention mode when at least one of the current average transactions per second value or the current average latency value exceeds the average transactions per second value or the average latency value for the short set period of time or the long set period of time;
   monitoring, by the network traffic management device, response codes in a number of server responses for at least one of the client devices or at least one resource requested by one or more of the client devices;
   comparing, by the network traffic management device, a ratio of invalid ones of the server responses to valid ones of the server responses for the client device or requested resource to a preestablished ratio threshold value, wherein the invalid ones of the server responses each comprise an invalid one of the response codes;
   marking, by the network traffic management device, the client device or requested resource as suspicious when the ratio exceeds the ratio threshold value and without restricting any network traffic when not in the prevention mode; and
   preventing, by the network traffic management device, the suspicious client device from transmitting at least one additional request to one or more of the servers, or the suspicious requested resource from being transmitted to one or more of the client devices, when in the prevention mode.

2. The method of claim 1, further comprising entering, by the network traffic management device, into the prevention mode upon detecting a network attack.

3. A non-transitory computer-readable medium having stored thereon executable instructions for protecting a network from network based attacks, which when executed by at least one processor, cause the processor to perform steps comprising:
   monitoring at least one of current transactions per second or current latency values for one or more established connections with one or more client devices and generating at least one of a current average transactions per second value or a current average latency value based on the monitoring;
   comparing at least one of the current average transactions per second value or the current average latency value to an average transactions per second value or an average latency value over at least one of a short set period of time or a long set period of time; and
   entering a prevention mode when at least one of the current average transactions per second value or the current average latency value exceeds the average transactions per second value or the average latency value for the short set period of time or the long set period of time;
   monitoring response codes in a number of server responses for at least one of the client devices or at least one resource requested by one or more of the client devices;
   comparing a ratio of invalid ones of the server responses to valid ones of the server responses for the client device or requested resource to a preestablished ratio threshold value, wherein the invalid ones of the server responses each comprise an invalid one of the response codes;
   marking the client device or requested resource as suspicious when the ratio exceeds the ratio threshold value and without restricting any network traffic when not in the prevention mode; and
   preventing the suspicious client device from transmitting at least one additional request to one or more of the servers, or the suspicious requested resource from being transmitted to one or more of the client devices, when in the prevention mode.

4. The non-transitory computer-readable medium of claim 3, further having stored thereon executable instructions which when executed by the processor further cause the processor to perform at least one additional step comprising entering into the prevention mode upon detecting a network attack.

5. A network traffic management device comprising at least one processor and a memory coupled to the processor which is configured to be capable of executing programmed instructions comprising and stored in the memory to:

monitor at least one of current transactions per second or current latency values for one or more established connections with one or more client devices and generating at least one of a current average transactions per second value or a current average latency value based on the monitoring;

compare at least one of the current average transactions per second value or the current average latency value to an average transactions per second value or an average latency value over at least one of a short set period of time or a long set period of time; and enter a prevention mode when at least one of the current average transactions per second value or the current average latency value exceeds the average transactions per second value or the average latency value for the short set period of time or the long set period of time;

monitor response codes in a number of server responses for at least one of the client devices or at least one resource requested by one or more of the client devices;

compare a ratio of invalid ones of the server responses to valid ones of the server responses for the client device or requested resource to a preestablished ratio threshold value, wherein the invalid ones of the server responses each comprise an invalid one of the response codes;

mark the client device or requested resource as suspicious when the ratio exceeds the ratio threshold value and without restricting any network traffic when not in the prevention mode; and prevent the suspicious client device from transmitting at least one additional request to one or more of the servers, or the suspicious requested resource from being transmitted to one or more of the client devices, when in the prevention mode.

6. The network traffic management device of claim 5, wherein the processor coupled to the memory is further configured to be capable of executing at least one additional programmed instruction to enter into the prevention mode upon detecting a network attack.

* * * * *